(12) United States Patent
Solanki et al.

(10) Patent No.: US 12,513,551 B2
(45) Date of Patent: Dec. 30, 2025

(54) GENERATING A CONFIGURATION DUMP REPORT OF A WIRELESS NETWORK

(71) Applicant: RAKUTEN MOBILE, INC., Tokyo (JP)

(72) Inventors: Preetam Solanki, Indore (IN); Jaya Bhatnagar, Indore (IN); Roshani Patel, Indore (IN); Alok Pawar, Indore (IN)

(73) Assignee: RAKUTEN MOBILE, INC., Tokyo (JP)

( * ) Notice: Subject to any disclaimer, the term of this patent is extended or adjusted under 35 U.S.C. 154(b) by 363 days.

(21) Appl. No.: 18/026,647

(22) PCT Filed: Dec. 28, 2022

(86) PCT No.: PCT/US2022/054112
§ 371 (c)(1),
(2) Date: Mar. 16, 2023

(87) PCT Pub. No.: WO2024/107216
PCT Pub. Date: May 23, 2024

(65) Prior Publication Data
US 2024/0292249 A1    Aug. 29, 2024

(30) Foreign Application Priority Data
Nov. 15, 2022    (IN) .................... 20221065325

(51) Int. Cl.
*H04W 4/00* (2018.01)
*H04L 41/0853* (2022.01)
*H04W 24/10* (2009.01)

(52) U.S. Cl.
CPC ......... *H04W 24/10* (2013.01); *H04L 41/0853* (2013.01)

(58) Field of Classification Search
CPC .......................... H04W 24/10; H04L 41/0853
See application file for complete search history.

(56) References Cited

U.S. PATENT DOCUMENTS

| | | | |
|---|---|---|---|
| 12,028,450 B2 * | 7/2024 | Su | H04L 9/08 |
| 2008/0153599 A1 * | 6/2008 | Atashband | G07F 17/32 463/42 |

(Continued)

OTHER PUBLICATIONS

International Search Report dated Mar. 27, 2023 in International Application No. PCT/US2022/054112.

(Continued)

*Primary Examiner* — Elisabeth Benoit Magloire
(74) *Attorney, Agent, or Firm* — Sughrue Mion, PLLC (57) ABSTRACT

A report generator system (100) for generating a configuration dump report of a wireless network (108) is provided. The report generator system (100) includes a processor (104) configured to generate the configuration dump report. The processor (104) is configured to receive a request from a user (107) to create the configuring dump report of the wireless network (108) comprising a plurality of network devices (110A-110N), and to retrieve inventory data, configuration parameters and current information related to the network devices (110A-110N) from the at least one of distributed database (103), parameter repository (102) and Inventory database (101). Further, the processor (104) is configured to determine a plurality of filters to download the configuration parameters and corresponding current information related to the network devices (110A-110N), and to generate the configuration dump report for the wireless network (108), and store the configuration dump report for the wireless network (108).

10 Claims, 6 Drawing Sheets

(56) References Cited

U.S. PATENT DOCUMENTS

| | | | | |
|---|---|---|---|---|
| 2008/0154916 | A1* | 6/2008 | Atashband | G06F 21/33 |
| 2013/0238145 | A1* | 9/2013 | Hammer | G01F 23/804 |
| | | | | 700/279 |
| 2020/0020443 | A1* | 1/2020 | Nielsen | G16H 40/67 |
| 2020/0327760 | A1* | 10/2020 | Taylor | G06Q 30/0639 |
| 2022/0294696 | A1* | 9/2022 | Ciulla | H04L 41/12 |

OTHER PUBLICATIONS

Written Opinion dated Mar. 27, 2023 in International Application No. PCT/US2022/054112.

* cited by examiner

Configuration Dump Report 600

| | Configuration Parameter_1 (CP1) | Configuration Parameter_2 (CP2) | Configuration Parameter_n (CPn) | Report Filters |
|---|---|---|---|---|
| Network Device_110A | current information_ CP1 | current information_ CP2 | current information_ CPn | Filter_1 by geography |
| Network Device_110B | current information_C P1 | current information_C P2 | current information_CP n | Filter_2 by category |
| Network Device 110C | current information_C P1 | current information_C P2 | current information_C Pn | Filter_3 by domain |
| ⋮ | ⋮ | ⋮ | ⋮ | Filter_4 by network type |
| Network Device_110N | current information_ CP1 | current information_ CP2 | current information_ CPn | Filter_N |

GENERATING A CONFIGURATION DUMP REPORT OF A WIRELESS NETWORK

CROSS REFERENCE TO RELATED APPLICATIONS

This application is a National Stage of International Application No. PCT/US2022/054112 filed Dec. 28, 2022, claiming priority based on India Patent Application No. 202241065325 filed Nov. 15, 2022.

FIELD OF INVENTION

The present disclosure relates to a report generator system and more specifically related to a method and the report generator system for generating a configuration dump report of a wireless network.

BACKGROUND

Generally, to maintain a health and performance of a wireless network, a configuration parameters of the wireless network are monitored. The configuration parameters of the wireless network are monitored by collecting the configuration parameters of network devices. Therefore collecting configuration parameters efficiently from the wireless network is an important function in monitoring.

Hence there is a high demand for collecting configuration parameters efficiently to maintain the health and performance of the wireless network.

In conventional systems and methods, a user goes through site wise of the wireless network for collecting the configuration parameters, as the wireless network has multiple sites which takes a longer time for collecting the configuration parameters for the wireless network. Further, in the conventional systems and methods, the user needs to manually search in order to get a category of the configuration parameters which increases the manual efforts and not user friendly. Further, the conventional methods cost higher and take a longer time to collect the configuration parameters of the wireless network.

Thus, it is desired to address the above mentioned disadvantages or other shortcomings or at least provide a useful alternative.

OBJECT OF INVENTION

The principal object of the embodiments herein is to provide a method and a report generator system for generating a configuration dump report of a wireless network, wherein the configuration dump report comprises configuration parameters related to network devices of the wireless network. Therefore the proposed system fetches current configuration of the wireless network with less manual effort in less time.

Another object of the embodiments herein is to determine a category of the configuration parameters related to the network devices, thus the categorized format of the configuration parameters helps a user to understand easily.

SUMMARY

Accordingly, embodiments herein disclose a report generator system for generating a configuration dump report of a wireless network. The report generator system includes a processor configured to receive a request from a user to create the configuring dump report of the wireless network comprising a plurality of network devices, wherein the request comprises a plurality of predefined user inputs. Further, the processor is configured to retrieve inventory data related to the network devices from the inventory database based on the plurality of predefined user inputs and retrieve configuration parameters related to the network devices from the parameter repository based on the plurality of predefined user inputs and the inventory data. Further, the processor is configured to retrieve current information related to the network devices from the distributed database based on the plurality of predefined user inputs, the inventory data, and the configuration parameters related to the network devices. Further, the processor is configured to determine a plurality of filters to download the configuration parameters and corresponding current information related to the network devices based on the inventory data related to the network devices, the configuration parameters related to the network devices, and the current information related to the network devices. Further, the processor is configured to generate the configuration dump report for the wireless network, wherein the configuration dump report comprises the configuration parameters related to the network devices, the current information of the parameters related to the network devices, and the plurality of filters to download the configuration parameters and corresponding current information related to the network devices and store the configuration dump report for the wireless network.

In an embodiment, the processor is configured to determine a geography of each of the network devices based on the inventory data related to the network devices, the configuration parameters related to the network devices, and the current information related to the network devices. Further, the processor is configured to determine a category of the configuration parameters related to the network devices based on the inventory data related to the network devices, the configuration parameters related to the network devices, and the current information related to the network devices. Further, the processor is configured to determine a domain of each of the network devices based on the inventory data related to the network devices, the configuration parameters related to the network devices, and the current information related to the network devices. Further, the processor is configured to determine a network type of each of the network devices based on the inventory data related to the network devices, the configuration parameters related to the network devices, and the current information related to the network devices. Further, the processor is configured to generate the plurality of filters, wherein the filters are related to the geography, the category, the domain, and the network type.

Accordingly, embodiments herein disclose a method for generating the configuration dump report of the wireless network by the report generator system. The method includes receiving, by the report generator system, the request from the user to create the configuring dump report of the wireless network comprising the plurality of network devices, wherein the request comprises the plurality of predefined user inputs and retrieving, by the report generator system, inventory data related to the network devices from the inventory database based on the plurality of predefined user inputs. The method further includes retrieving, by the report generator system, configuration parameters related to the network devices from the parameter repository based on the plurality of predefined user inputs and the inventory data and retrieving, by the report generator system, current information related to the network devices from the distributed database based on the plurality of predefined user inputs, the inventory data, and the configuration parameters related to the network devices. The method further includes determining, by the report generator system, the plurality of filters to download the configuration parameters and corresponding current information related to the network devices based on the inventory data related to the network devices, the configuration parameters related to the network devices, and the current information related to the network devices. The method further includes generating, by the report generator system, the configuration dump report for the wireless network, wherein the configuration dump report comprises the configuration parameters related to the network devices, the current information of the parameters related to the network devices, and the plurality of filters to download the configuration parameters and corresponding current information related to the network devices and storing, by the report generator system, the configuration dump report for the wireless network.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein, and the embodiments herein include all such modifications.

BRIEF DESCRIPTION OF FIGURES

This invention is illustrated in the accompanying drawings, throughout which like reference letters indicate corresponding parts in the various figures. The embodiments herein will be better understood from the following description with reference to the drawings, in which.

DETAILED DESCRIPTION OF INVENTION

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as units or modules or the like, are physically implemented by analog or digital circuits such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the invention. Likewise, the blocks of the embodiments may be physically combined into more complex blocks without departing from the scope of the invention The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

Accordingly, embodiments herein disclose a report generator system for generating a configuration dump report of a wireless network. The report generator system includes a processor configured to receive a request from a user to create the configuring dump report of the wireless network comprising a plurality of network devices, wherein the request comprises a plurality of predefined user inputs. Further, the processor is configured to retrieve inventory data related to the network devices from the inventory database based on the plurality of predefined user inputs and retrieve configuration parameters related to the network devices from the parameter repository based on the plurality of predefined user inputs and the inventory data. Further, the processor is configured to retrieve current information related to the network devices from the distributed database based on the plurality of predefined user inputs, the inventory data, and the configuration parameters related to the network devices. Further, the processor is configured to determine a plurality of filters to download the configuration parameters and corresponding current information related to the network devices based on the inventory data related to the network devices, the configuration parameters related to the network devices, and the current information related to the network devices. Further, the processor is configured to generate the configuration dump report for the wireless network, wherein the configuration dump report comprises the configuration parameters related to the network devices, the current information of the parameters related to the network devices, and the plurality of filters to download the configuration parameters and corresponding current information related to the network devices and store the configuration dump report for the wireless network.

Accordingly, embodiments herein disclose a method for generating the configuration dump report of the wireless network by the report generator system. The method includes receiving, by the report generator system, the request from the user to create the configuring dump report of the wireless network comprising the plurality of network devices, wherein the request comprises the plurality of predefined user inputs and retrieving, by the report generator system, inventory data related to the network devices from the inventory database based on the plurality of predefined user inputs. The method further includes retrieving, by the report generator system, configuration parameters related to the network devices from the parameter repository based on the plurality of predefined user inputs and the inventory data and retrieving, by the report generator system, current information related to the network devices from the distributed database based on the plurality of predefined user inputs, the inventory data, and the configuration parameters related to the network devices. The method further includes determining, by the report generator system, the plurality of filters to download the configuration parameters and corresponding current information related to the network devices based on the inventory data related to the network devices, the configuration parameters related to the network devices, and the current information related to the network devices. The method further includes generating, by the report generator system, the configuration dump report for the wireless network, wherein the configuration dump report comprises the configuration parameters related to the network devices, the current information of the parameters related to the network devices, and the plurality of filters to download the configuration parameters and corresponding current information related to the network devices and storing, by the report generator system, the configuration dump report for the wireless network.

In conventional methods and systems, the user goes through site wise of the wireless network for collecting the configuration parameter and the wireless network has multiple sites, as a result, collecting the configuration parameters takes longer time for the wireless network.

Further, in some other conventional systems and methods, the user needs to manually search to get a category of the configuration parameters which increases the manual efforts and it is not user-friendly.

Unlike to the conventional methods and systems, the proposed method can generate the configuration dump report for the wireless network with a single click, wherein the configuration dump report comprises the configuration parameters related to the network devices, and the current information of the parameters related to the network devices.

Unlike to the conventional methods and systems, the proposed method can download the configuration parameters and the corresponding current information related to the network devices based on selected filters. The proposed method can display the configuration dump report along with filters for the wireless network in a display to the user.

Unlike to the conventional methods and systems, the proposed method combines the inventory data, the configuration parameters, and the current information belonging to different sources.

Referring now to the drawings, and more particularly to FIGS. 1 through 6, where similar reference characters denote corresponding features consistently throughout the figures, there are shown preferred embodiments.

Figure 1:
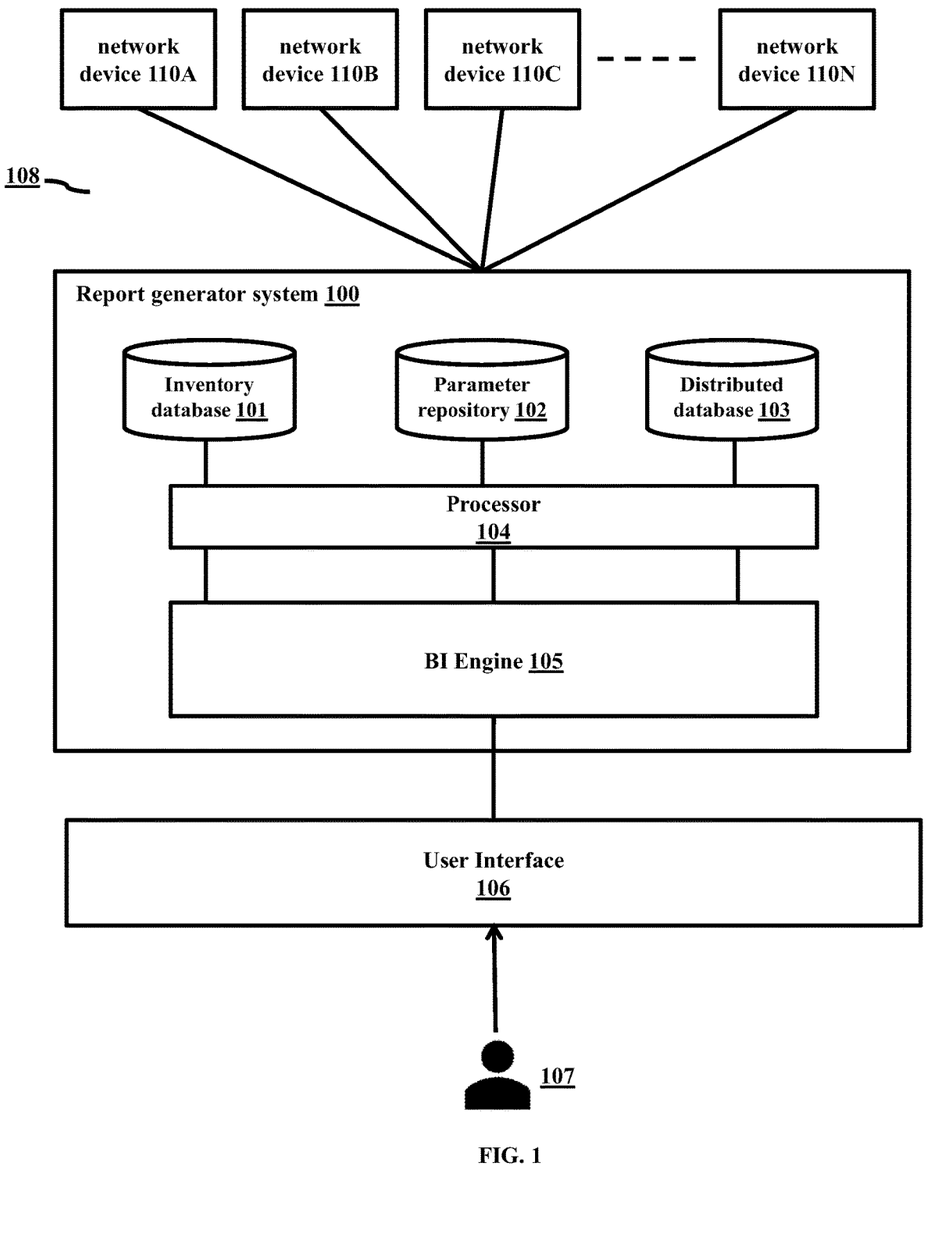
FIG. 1 illustrates a block diagram of a report generator system for generating a configuration dump report of a wireless network, according to an embodiment as disclosed herein.

FIG. 1 illustrates a block diagram of a report generator system (100) for generating a configuration dump report of a wireless network (108), according to an embodiment as disclosed herein.

Although the FIG. 1 shows the hardware elements of the report generator system (100) but it is to be understood that other embodiments are not limited thereon. In other embodiments, the report generator system (100) may include less or more number of elements. Further, the labels or names of the elements are used only for illustrative purpose and does not limit the scope of the invention. One or more components can be combined together to perform same or substantially similar function.

The report generator system (100) includes a processor (104), a BI engine (105), an inventory database (101), a parameter repository (102) and a distributed database (103). The processor (104) is configured to execute instructions for generating the configuration dump report. The processor (104) may be a general-purpose processor, such as a Central Processing Unit (CPU), an Application Processor (AP), or the like, a graphics-only processing unit such as a Graphics Processing Unit (GPU), a Visual Processing Unit (VPU) and the like. The processor (104) may include multiple cores to execute the instructions.

The processor (104) is implemented by processing circuitry such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductors.

In an embodiment, the processor (104) is configured to receive a request from a user (107) to create the configuring dump report of the wireless network (108) comprising a plurality of network devices (110A-110N), wherein the request comprises a plurality of predefined user inputs. Further, the processor (104) is configured to retrieve inventory data related to the network devices (110A-110N) from the inventory database (101) based on the plurality of predefined user inputs and retrieve configuration parameters related to the network devices (110A-110N) from the parameter repository (102) based on the plurality of predefined user inputs and the inventory data. Further, the processor (104) is configured to retrieve current information related to the network devices (110A-110N) from the distributed database (103) based on the plurality of predefined user inputs, the inventory data, and the configuration parameters related to the network devices (110A-110N). Further, the processor (104) is configured to determine a plurality of filters to download the configuration parameters and corresponding current information related to the network devices (110A-110N) based on the inventory data related to the network devices (110A-110N), the configuration parameters related to the network devices (110A-110N), and the current information related to the network devices (110A-110N). Further, the processor (104) is configured to generate the configuration dump report for the wireless network (108), wherein the configuration dump report comprises the configuration parameters related to the network devices (110A-110N), the current information of the parameters related to the network devices (110A-110N), and the plurality of filters to download the configuration parameters and corresponding current information related to the network devices (110A-110N) and store the configuration dump report for the wireless network (108).

In an embodiment, the processor (104) is configured to display the configuration dump report for the wireless network (108) on the display to the user (107) and detect at least one filter from the plurality of filters selected by the user (107). Further, the processor (104) is configured to download the configuration parameters and the corresponding current information related to the network devices (110A-110N) based on the at least one selected filter.

In an embodiment, the processor (104) is configured to create headers of a sheet of the configuration dump report based on the configuration parameters related to the network devices (110A-110N), the inventory data related to the network devices (110A-110N), and the plurality of filters. Further, the processor (104) is configured to combine the inventory data related to the network devices (110A-110N), the configuration parameters related to the network devices (110A-110N), and the current information related to the network devices (110A-110N). Further, the processor (104) is configured to divide the combined data into a plurality of chunks and distribute the plurality of chunks and the current information related to a plurality of executor devices. Further, the processor (104) is configured to receive a file generated by each executor device of the plurality of executor devices and generate the configuration dump report by combining the files received from each of the executor devices.

In an embodiment, the processor (104) is configured to determine a geography of each of the network devices (110A-110N) based on the inventory data related to the network devices (110A-110N), the configuration parameters related to the network devices (110A-110N), and the current information related to the network devices (110A-110N). Further, the processor (104) is configured to determine a category of the configuration parameters related to the network devices (110A-110N) based on the inventory data related to the network devices (110A-110N), the configuration parameters related to the network devices (110A-110N), and the current information related to the network devices (110A-110N). Further, the processor (104) is configured to determine a domain of each of the network devices (110A-110N) based on the inventory data related to the network devices (110A-110N), the configuration parameters related to the network devices (110A-110N), and the current information related to the network devices (110A-110N). Further, the processor (104) is configured to determine a network type of each of the network devices (110A-110N) based on the inventory data related to the network devices (110A-110N), the configuration parameters related to the network devices (110A-110N), and the current information related to the network devices (110A-110N) and generate the plurality of filters, wherein the filters related to the geography, the category, the domain, and the network type.

In an embodiment, the processor (104) is configured to extract data from structural and non-structural databases including the inventory database (101), the parameter repository (102), and the distributed database (103) by queries. The processor (104) processes the extracted data through code and provides the extracted data in a desired format e.g. excel format.

In an embodiment, the processor (104) is configured to generate a custom report based on the configuration dump report and store the custom report in report template database i.e. storage. Further, the processor (104) is configured to update a path of the custom report, stored in the report template database, in the report generator system (100).

Figure 2:
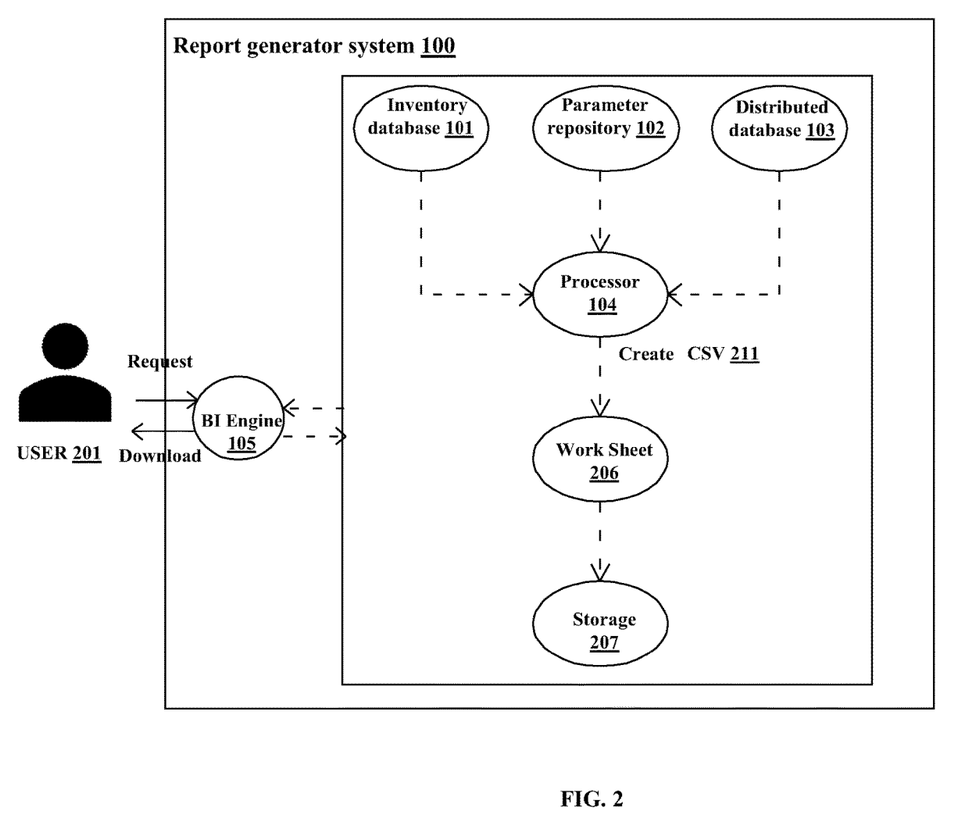
FIG. 2 is a flow diagram illustrating a creation of comma-separated values (CSV) files in the process of generating the configuration dump report, according to an embodiment as disclosed herein.

FIG. 2 is a flow diagram illustrating creation of comma-separated values (CSV) (211) files in a process of generating the configuration dump report, according to an embodiment as disclosed herein.

The user (107) request a Business Intelligence (BI) engine (105) to generate a configuration dump report, wherein the user (107) request the BI engine (105) by providing various input for which configuration dump report needs to be generated.

The processor (104) is configured to search at least one of distributed database (103), parameter repository (102) and Inventory database (101) based on the user inputs. Further, the processor (104) is configured to combine the inventory data related to the network devices (110A-110N), the configuration parameters related to the network devices (110A-110N), and the current information related to the network devices (110A-110N). Further, the processor (104) is configured to divide the combined data into a plurality of chunks in a CSV (211) format on the basis of the user input e.g. swversion, category, netype. Further, the processor (104) is configured to distribute the plurality of chunks and the current information related to a plurality of executor devices and receive a file generated by each executor device of the plurality of executor devices. Further, the processor (104) is configured to generate the configuration dump report by combining the files in the CSV (211) format which is received from each of the executor devices. Further, the processor (104) is configured to generate the configuration dump report with at least two CSV (211), wherein each is related to a category of data.

The processor (104) is configured to combine the at least two CSV (211) files to generate the configuration dump report in an excel file format with at least two work sheets (206), wherein each work sheet (206) of the excel file has information of a single CSV (211) file. Further, the processor (104) is configured to store the configuration dump report for the wireless network (108) in the storage (207).

Figure 3:
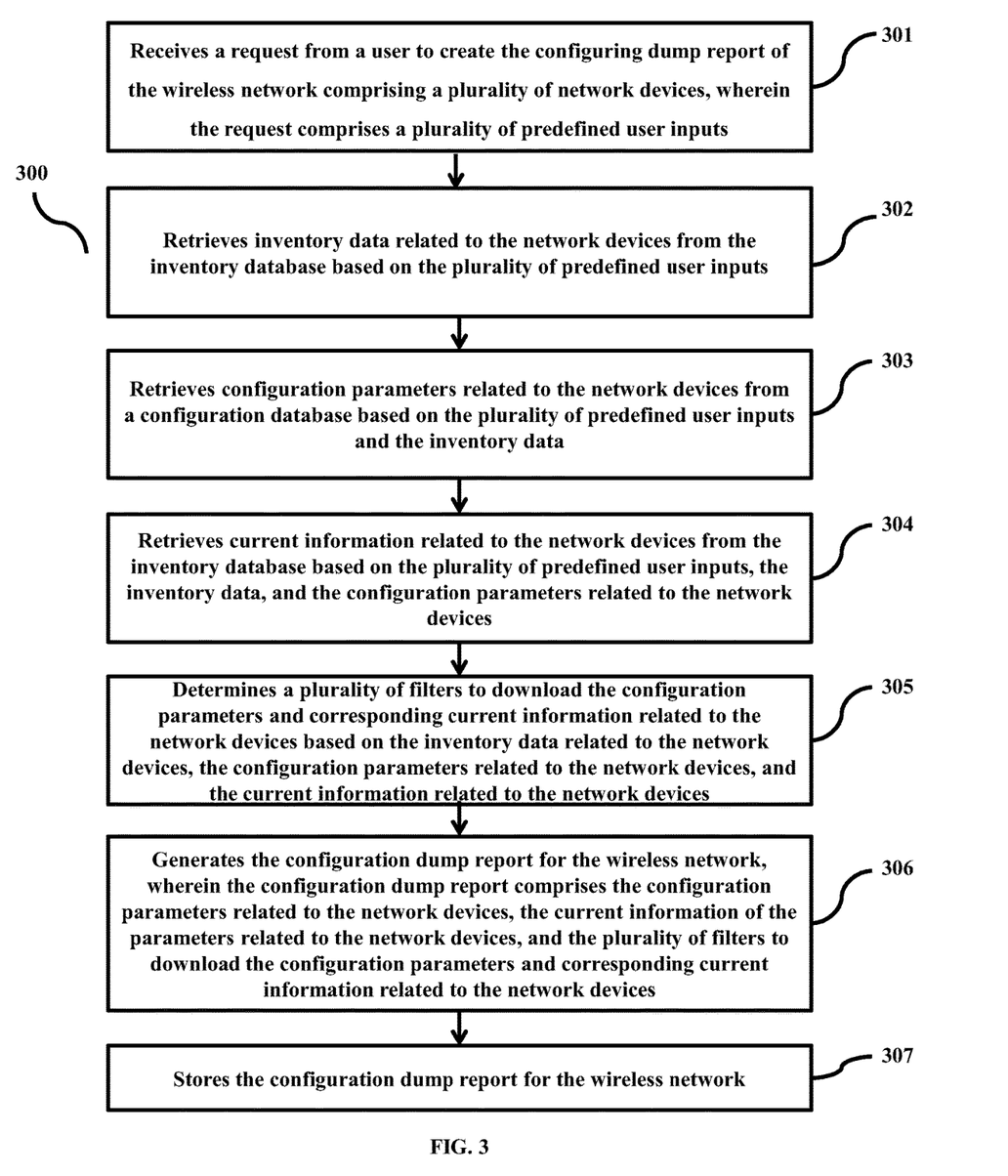
FIG. 3 is a flow diagram illustrating a method for generating the configuration dump report of a wireless network, according to an embodiment as disclosed herein.

FIG. 3 is a flow diagram (300) illustrating a method for generating the configuration dump report of the wireless network (108), according to an embodiment as disclosed herein.

At step 301, the Report generator system (100) receives a request from the user (107) to create the configuring dump report of the wireless network (108) comprising a plurality of network devices (110A-110N), wherein the request comprises a plurality of predefined user inputs.

At step 302, the Report generator system (100) retrieves inventory data related to the network devices (110A-110N) from the inventory database (101) based on the plurality of predefined user inputs.

At step 303, the Report generator system (100) retrieves configuration parameters related to the network devices (110A-110N) from a configuration database based on the plurality of predefined user inputs and the inventory data.

At step 304, the Report generator system (100) retrieves current information related to the network devices (110A-110N) from the inventory database (101) based on the plurality of predefined user inputs, the inventory data, and the configuration parameters related to the network devices (110A-110N)

At step 305, the Report generator system (100) determines a plurality of filters to download the configuration parameters and corresponding current information related to the network devices (110A-110N) based on the inventory data related to the network devices (110A-110N), the configuration parameters related to the network devices (110A-110N), and the current information related to the network devices (110A-110N)

At step 306, the Report generator system (100) generates the configuration dump report for the wireless network (108), wherein the configuration dump report comprises the configuration parameters related to the network devices (110A-110N), the current information of the parameters related to the network devices (110A-110N), and the plurality of filters to download the configuration parameters and corresponding current information related to the network devices (110A-110N).

At step 307, the report generator system (100) stores the configuration dump report for the wireless network (108).

Figure 4:
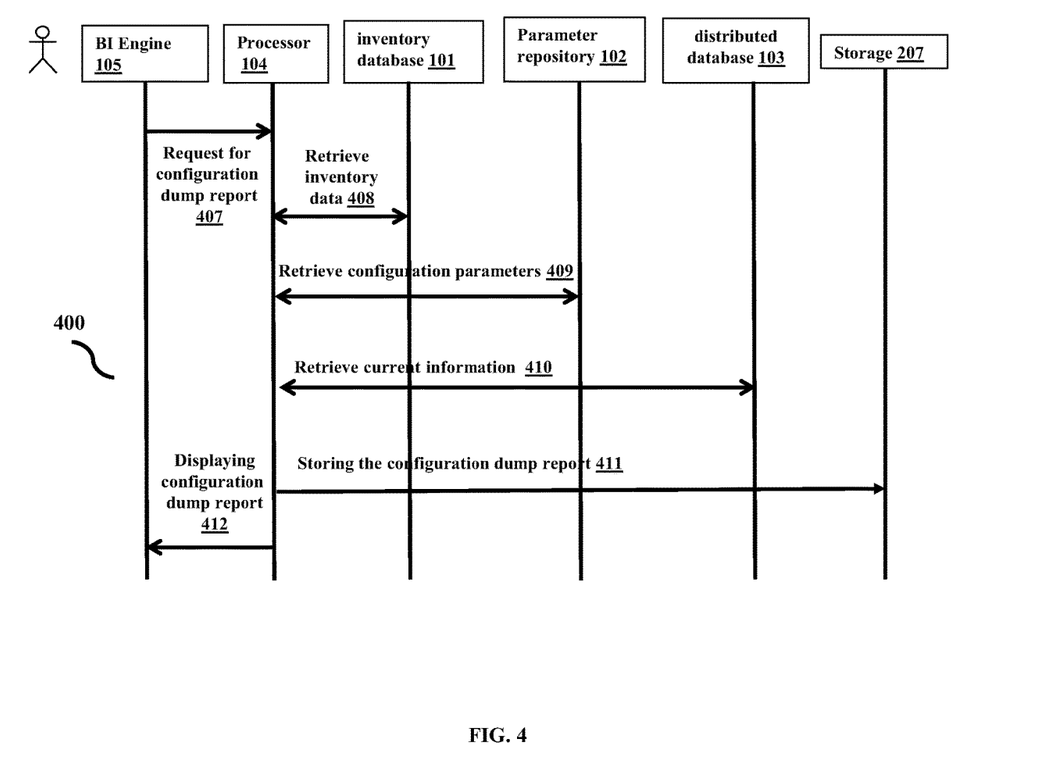
FIG. 4 is a sequence diagram illustrating the sequence from the request from a user for the configuration dump report till the generation of the configuration dump report, according to an embodiment as disclosed herein.

The various actions acts, blocks, steps, or the like in the flow diagram (300) may be performed in the order presented, in a different order, or simultaneously. Further, in some embodiments, some of the actions, acts, blocks, steps, or the like may be omitted, added, modified, skipped, or the like without departing from the scope of the invention FIG. 4 is a sequence diagram (400) illustrating the sequence from the request from the user (107) for the configuration dump report till the generation of the configuration dump report.

The user (107) request the BI engine (105) to generate a configuration dump report, wherein the user (107) request the BI engine (105) by providing various input for which the configuration dump report needs to be generated.

At 407, the BI sends the request for the configuration dump report to the processor (104). At 408, the processor (104) requests the inventory database (101) and retrieves inventory data related to the network devices (110A-110N) from the inventory database (101) based on the plurality of the user inputs. The inventory database (101) is used to store device information. Examples of the inventory data include domain including Radio Access Network (RAN), transport, core and the inventory data of vendor includes altiostar, sirspan, and sercomm.

At 409, the processor (104) requests the parameter repository (102) and retrieves configuration parameters related to the network devices (110A-110N) based on the plurality of user inputs and the inventory data. The parameter repository (102) has all network devices (110A-110N) parameter details.

At step 410, the processor (104) request the distributed database (103) and retrieves current information related to the network devices (110A-110N) from the distributed database (103) based on the plurality of the user inputs, the inventory data, and the configuration parameters related to the network devices (110A-110N). Example of distributed database (103) is Hbase which stores parameter values for every day of the network devices (110A-110N).

The processor (104) generates the configuration dump report for the wireless network (108), wherein the configuration dump report comprises the configuration parameters related to the network devices (110A-110N), the current information of the parameters related to the network devices (110A-110N), and the plurality of filters to download the configuration parameters and corresponding current information related to the network devices (110A-110N) and at 411 the processor (104) store the configuration dump report for the wireless network (108) at the storage (207).

At 412, the BI engine (105) receives the configuration dump report and displays the configuration dump report to the user (107).

Figure 5:
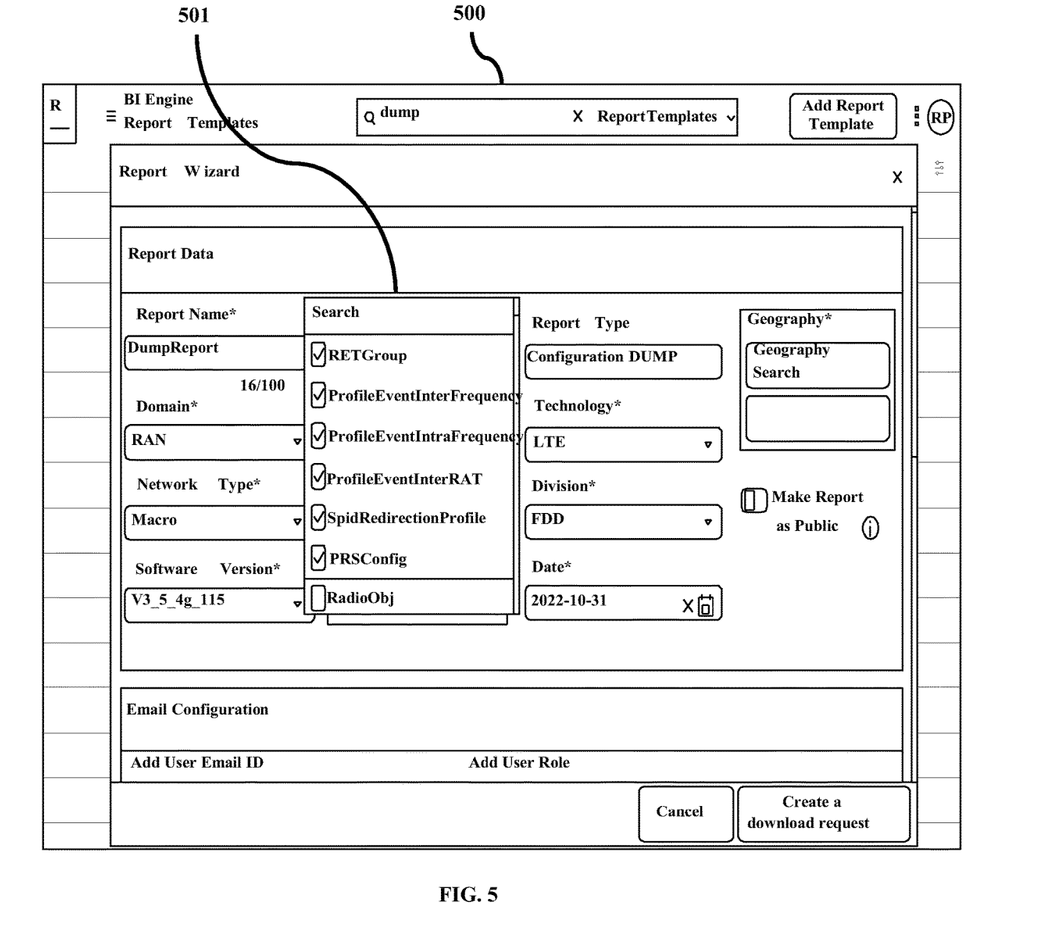
FIG. 5 is an example illustrating a user interface of a BI engine while receiving a plurality of the user inputs to generate the configuring dump report of the wireless network, according to an embodiment as disclosed herein.

FIG. 5 is an example illustrating a user interface (106) (500) of the BI engine (105) while receiving the plurality of the user inputs to generate the configuring dump report of the wireless network (108), according to an embodiment as disclosed herein.

The BI engine (105) of the report generator system (100) receives the plurality of the user inputs to create the configuring dump report of the wireless network (108). In the FIG. 5, the BI engine (105) interface displays a plurality of the user-selected inputs (501). For example, the user-selected input includes domain selection, network type selection, software version selection, technology selection, division selection, and geography selection. Further while selecting the inputs, the user (107) has to select a sub-categories, for example, while selecting the domain as RAN, the user (107) has to select the sub-categories like RET group, profileeventintrafrequency, profileeventinterfrequency, profileeventinterrat for generating configuration report based on the selected inputs.

Figure 6:
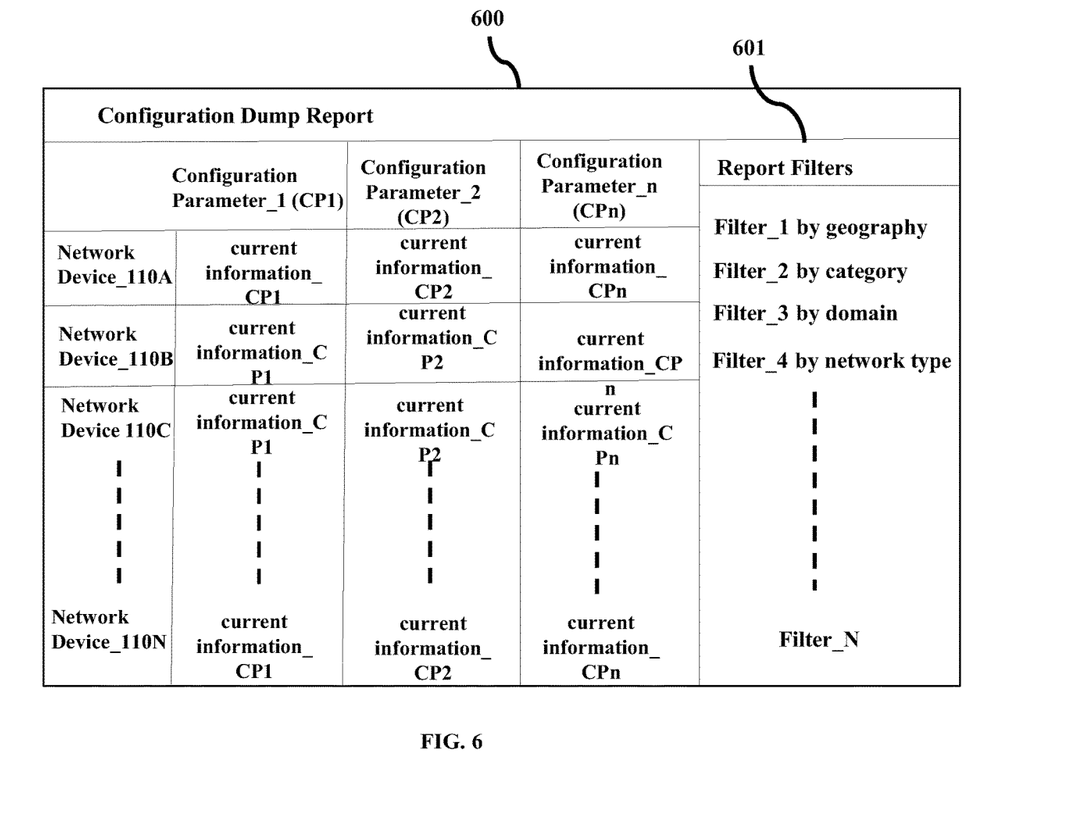
FIG. 6 is an example illustrating an interface (600) of the generated configuration dump report, according to an embodiment as disclosed herein.

FIG. 6 is an example illustrating an interface (600) of the generated configuration dump report, according to an embodiment as disclosed herein.

The generated configuration dump report comprises the configuration parameters related to the network devices (110A-110N), the current information of the parameters related to the network devices (110A-110N), and the plurality of filters to download the configuration parameters and corresponding current information related to the network devices (110A-110N). Further, generated configuration dump report has a plurality of report filters (601), for example, the filters related to the geography, the category, the domain, and the network type.

The Report generation system further detects at least one filter from the plurality of filters selected by the user (107) and downloads the configuration parameters and the corresponding current information related to the network devices (110A-110N) based on the at least one selected filter. The Report generation system further creates headers of work sheet of the configuration dump report based on the configuration parameters related to the network devices (110A-110N), the inventory data related to the network devices (110A-110N), and the plurality of filters. Example information provided in the configuration dump report among other things is explained. For example in the FIG. 6, the headers include Configuration Parameter_1 (CP1), Configuration Parameter_2 (CP2), and Configuration Parameter_n (CPn). The report generation system displays the configuration dump report for the wireless network (108) on the display to the user (107). The configuration dump report displays current information_CP1, current information_CP2, and current information_CPn for the network devices (110A-110N).

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the scope of the embodiments as described herein.

We claim:

1. A report generator system for generating a configuration dump report of a wireless network, wherein the report generator system comprises:
    a display;
    a processor;
    a storage, wherein the storage comprises information about an inventory database, a parameter repository, and a distributed database; and
    the processor, communicatively coupled to the display and the storage, configured to:
        receive a request from a user to create the configuration dump report of the wireless network comprising a plurality of network devices, wherein the request comprises a plurality of predefined user inputs;
        retrieve inventory data related to the network devices from the inventory database based on the plurality of predefined user inputs;
        retrieve configuration parameters related to the network devices from the parameter repository based on the plurality of predefined user inputs and the inventory data;
        retrieve current information related to the network devices from the distributed database based on the plurality of predefined user inputs, the inventory data, and the configuration parameters related to the network devices;
        determine a plurality of filters to download the configuration parameters and corresponding current information related to the network devices based on the inventory data related to the network devices, the configuration parameters related to the network devices, and the current information related to the network devices;
        generate the configuration dump report for the wireless network, wherein the configuration dump report comprises the configuration parameters related to the network devices, the current information of the parameters related to the network devices, and the plurality of filters to download the configuration parameters and corresponding current information related to the network devices; and
        store the configuration dump report for the wireless network.

2. The report generator system as claimed in claim 1, wherein the processor is configured to:
    display the configuration dump report for the wireless network on the display to the user;
    detect at least one filter from the plurality of filters selected by the user; and
    download the configuration parameters and the corresponding current information related to the network devices based on the at least one selected filter.

3. The report generator system as claimed in claim 1, wherein generate the configuration dump report for the wireless network comprises:
    create headers of sheet of the configuration dump report based on the configuration parameters related to the network devices, the inventory data related to the network devices, and the plurality of filters;
    combine the inventory data related to the network devices, the configuration parameters related to the network devices, and the current information related to the network devices;
    divide the combined data into a plurality of chunks;
    distribute the plurality of chunks and the current information related to a plurality of executor devices;
    receive a file generated by each executor device of the plurality of executor devices; and
    generate the configuration dump report by combining the files received from each of the executor devices.

4. The report generator system as claimed in claim 1, wherein determine the plurality of filters to download the configuration parameters and corresponding current information related to the network devices comprises:
    determine a geography of each of the network devices based on the inventory data related to the network devices, the configuration parameters related to the network devices, and the current information related to the network devices;
    determine a category of the configuration parameters related to the network devices based on the inventory data related to the network devices, the configuration parameters related to the network devices, and the current information related to the network devices;
    determine a domain of each of the network devices based on the inventory data related to the network devices, the configuration parameters related to the network devices, and the current information related to the network devices;
    determine a network type of each of the network devices based on the inventory data related to the network devices, the configuration parameters related to the network devices, and the current information related to the network devices; and
    generate the plurality of filters, wherein the filters related to the geography, the category, the domain, and the network type.

5. The report generator system as claimed in claim 1, wherein the report generator system comprises:
    generate a custom report based on the configuration dump report;
    store the custom report in report template database; and
    update a path of the custom report, stored in the report template database, in the report generator system.

6. A method for generating a configuration dump report of a wireless network by a report generator system comprises:
    receiving, by the report generator system, a request from a user to create the configuration dump report of the wireless network comprising a plurality of network devices, wherein the request comprises a plurality of predefined user inputs;
    retrieving, by the report generator system, inventory data related to the network devices from an inventory database based on the plurality of predefined user inputs;
    retrieving, by the report generator system, configuration parameters related to the network devices from a parameter repository based on the plurality of predefined user inputs and the inventory data;
    retrieving, by the report generator system, current information related to the network devices from a distributed database based on the plurality of predefined user inputs, the inventory data, and the configuration parameters related to the network devices;
    determining, by the report generator system, a plurality of filters to download the configuration parameters and corresponding current information related to the network devices based on the inventory data related to the network devices, the configuration parameters related to the network devices, and the current information related to the network devices;
    generating, by the report generator system, the configuration dump report for the wireless network, wherein the configuration dump report comprises the configuration parameters related to the network devices, the current information of the parameters related to the network devices, and the plurality of filters to download the configuration parameters and corresponding current information related to the network devices; and storing, by the report generator system, the configuration dump report for the wireless network.

7. The method as claimed in claim 6, wherein the method comprises:

displaying, by the report generator system, the configuration dump report for the wireless network on the display to the user;

detecting, by the report generator system, at least one filter from the plurality of filters selected by the user; and downloading, by the report generator system, the configuration parameters and the corresponding current information related to the network devices based on the at least one selected filter.

8. The method as claimed in claim 6, wherein generating the configuration dump report for the wireless network comprises:

creating, by the report generator system, headers of sheet of the configuration dump report based on the configuration parameters related to the network devices, the inventory data related to the network devices, and the plurality of filters;

combining, by the report generator system, the inventory data related to the network devices, the configuration parameters related to the network devices, and the current information related to the network devices;

dividing, by the report generator system, the combined data into a plurality of chunks;

distributing, by the report generator system, the plurality of chunks and the current information related to a plurality of executor devices;

receiving, by the report generator system, a file generated by each executor device of the plurality of executor devices; and generating, by the report generator system, the configuration dump report by combining the files received from each of the executor devices.

9. The method as claimed in claim 6, wherein determining the plurality of filters to download the configuration parameters and corresponding current information related to the network devices comprises:

determining, by the report generator system, a geography of each of the network devices based on the inventory data related to the network devices, the configuration parameters related to the network devices, and the current information related to the network devices;

determining, by the report generator system, a category of the configuration parameters related to the network devices based on the inventory data related to the network devices, the configuration parameters related to the network devices, and the current information related to the network devices;

determining, by the report generator system, a domain of each of the network devices based on the inventory data related to the network devices, the configuration parameters related to the network devices, and the current information related to the network devices;

determining, by the report generator system, a network type of each of the network devices based on the inventory data related to the network devices, the configuration parameters related to the network devices, and the current information related to the network devices; and generating, by the report generator system, the plurality of filters, wherein the filters are related to the geography, the category, the domain, and the network type.

10. The method as claimed in claim 6, wherein the method comprises:

generating, by the report generator system, a custom report based on the configuration dump report;

storing, by the report generator system, the custom report in report template database; and updating, by the report generator system, a path of the custom report, stored in the report template database, in the report generator system.

\* \* \* \* \*